US010967830B2

(12) United States Patent
Nakamura et al.

(10) Patent No.: US 10,967,830 B2
(45) Date of Patent: Apr. 6, 2021

(54) COLLIDING OBJECT PROTECTION APPARATUS

(71) Applicant: HONDA MOTOR CO., LTD., Tokyo (JP)

(72) Inventors: Hidetoshi Nakamura, Wako (JP); Kenyu Okamura, Wako (JP); Masaki Umezawa, Wako (JP); Osamu Ito, Wako (JP); Masato Sasaki, Wako (JP); Masahiro Motoyoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/429,405

(22) Filed: Jun. 3, 2019

(65) Prior Publication Data

US 2019/0366972 A1    Dec. 5, 2019

(30) Foreign Application Priority Data

Jun. 4, 2018 (JP) ............................. JP2018-107107

(51) Int. Cl.
*B60R 21/36* (2011.01)
*B60R 21/00* (2006.01)
*B60R 21/0134* (2006.01)
*B60R 21/0136* (2006.01)
*B60R 21/34* (2011.01)

(52) U.S. Cl.
CPC ............ *B60R 21/36* (2013.01); *B60R 21/00* (2013.01); *B60R 21/0134* (2013.01); *B60R 21/0136* (2013.01); *B60R 2021/0004* (2013.01); *B60R 2021/346* (2013.01)

(58) Field of Classification Search
CPC ................................ B60R 21/36; B60R 21/34
See application file for complete search history.

(56) References Cited

U.S. PATENT DOCUMENTS

| 2004/0074690 A1* | 4/2004 | Sato ....................... B60R 21/36 180/274 |
| 2009/0289471 A1* | 11/2009 | Finney .................... B60R 19/40 296/187.04 |
| 2017/0282845 A1 | 10/2017 | Nagasawa et al. |
| 2017/0282846 A1* | 10/2017 | Nagasawa ........... B60R 21/0134 |
| 2019/0001919 A1* | 1/2019 | Farooq ................... B60R 21/36 |

FOREIGN PATENT DOCUMENTS

JP    2017-178211 A    10/2017

* cited by examiner

*Primary Examiner* — Paul N Dickson
*Assistant Examiner* — Daniel M. Keck
(74) *Attorney, Agent, or Firm* — Rankin, Hill & Clark LLP

(57) ABSTRACT

A colliding object protection apparatus inflates and deploys an airbag when the apparatus detects or predicts a collision with a pedestrian. The airbag includes a first bag to be inflated and deployed in a vehicle width direction along a front edge part of a hood of a vehicle, and a second bag to be inflated and deployed on an upper surface of the hood. The second bag is continuous with a vehicle rear side portion of the first bag. An internal space of the first bag and an internal space of the second bag communicate with each other through a first vent mechanism. The first vent mechanism is opened when an internal pressure of the first bag reaches a predetermined pressure.

5 Claims, 5 Drawing Sheets

COLLIDING OBJECT PROTECTION APPARATUS

BACKGROUND OF THE INVENTION

1. Field of the Invention

The present invention relates to a colliding object protection apparatus for protecting a colliding object by absorbing and relaxing an impact applied to the colliding object in case of a collision of a vehicle with the colliding object.

2. Description of the Related Art

Atypical colliding object protection apparatus to be mounted on a vehicle is configured to inflate and deploy an airbag onto an upper part of a front grill when the apparatus detects or predicts a collision of a colliding object with the vehicle (see Japanese Patent Application Publication No. 2017-178211, for example).

SUMMARY OF THE INVENTION

In order to effectively prevent a pedestrian from being injured if a vehicle collides with the pedestrian, it is desirable to restrain behavior of the pedestrian by surely catching the pedestrian with an airbag and rapidly eliminating a difference in speed between the vehicle and the pedestrian.

In view of the above, it is an object of the present invention to provide a colliding object protection apparatus which is capable of effectively preventing a colliding object from being injured by restraining behavior of the colliding object when the colliding object collides with a vehicle.

To attain the object, the present invention provides a colliding object protection apparatus that inflates and deploys an airbag when the apparatus detects or predicts a collision with a colliding object. Here, the airbag includes a first bag to be inflated and deployed in a vehicle width direction along a front edge part of a hood of a vehicle, and a second bag to be inflated and deployed on an upper surface of the hood. The second bag is continuous with a vehicle rear side portion of the first bag. An internal space of the first bag and an internal space of the second bag communicate with each other through a vent mechanism. The vent mechanism is configured to be opened when an internal pressure of the first bag reaches a predetermined pressure.

The colliding object protection apparatus of the present invention can rapidly eliminate a difference in speed between a vehicle and a colliding object in case of a collision, thereby restraining behavior of the colliding object. Thus, the colliding object protection apparatus can effectively prevent the colliding object from being injured. In addition, the apparatus can stabilize a shape of the first bag and increase strength of the first bag.

DETAILED DESCRIPTION OF THE EMBODIMENTS

An embodiment of the present invention will be described in detail with reference to the drawings as appropriate.

In this embodiment, a description will be given of a colliding object protection apparatus for absorbing and relaxing an impact to be applied to a pedestrian being a colliding object if a vehicle being an automobile collides with the pedestrian when the vehicle is in motion.

Figure 2:
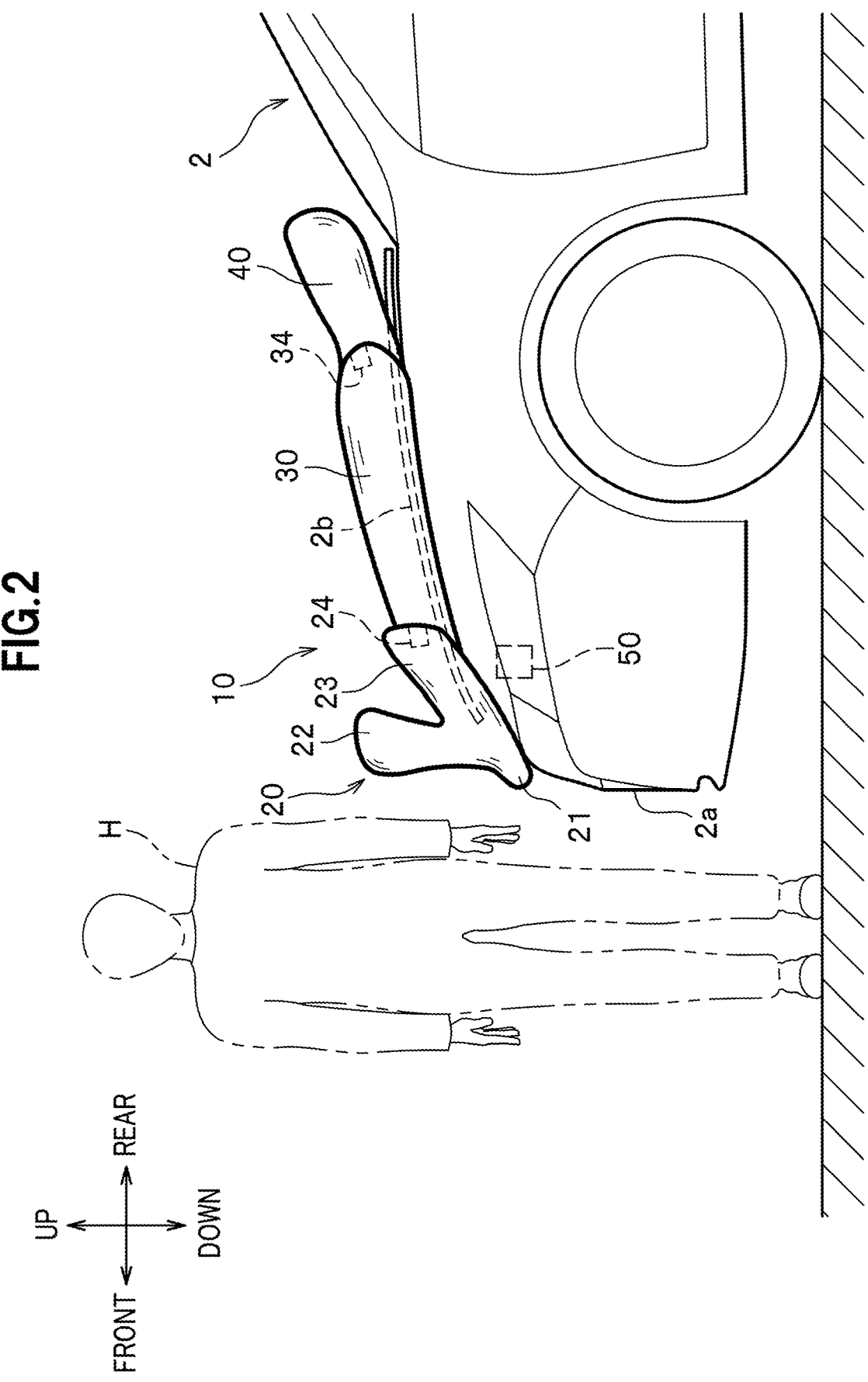
FIG. 2 is a side view showing the colliding object protection apparatus according to the embodiment of the present invention.

As shown in FIG. 2, a colliding object protection apparatus 1 includes an airbag 10 which is inflated and deployed on a front part of a vehicle 2, an inflator 50 which sends a gas into the airbag 10, and a collision determination device (not shown).

The collision determination device is formed from an electronic control unit (ECU) configured to detect or predict a collision of the vehicle 2 with a colliding object based on signals from sensors and a radar mounted on the vehicle 2.

When the collision determination device detects or predicts a collision of a pedestrian H with the vehicle 2, the vehicle 2 lifts up a hood 2b and the inflator 50 is activated in the meantime. Note that the collision determination device is formed from an existing device and its configuration is not limited.

Figure 1:
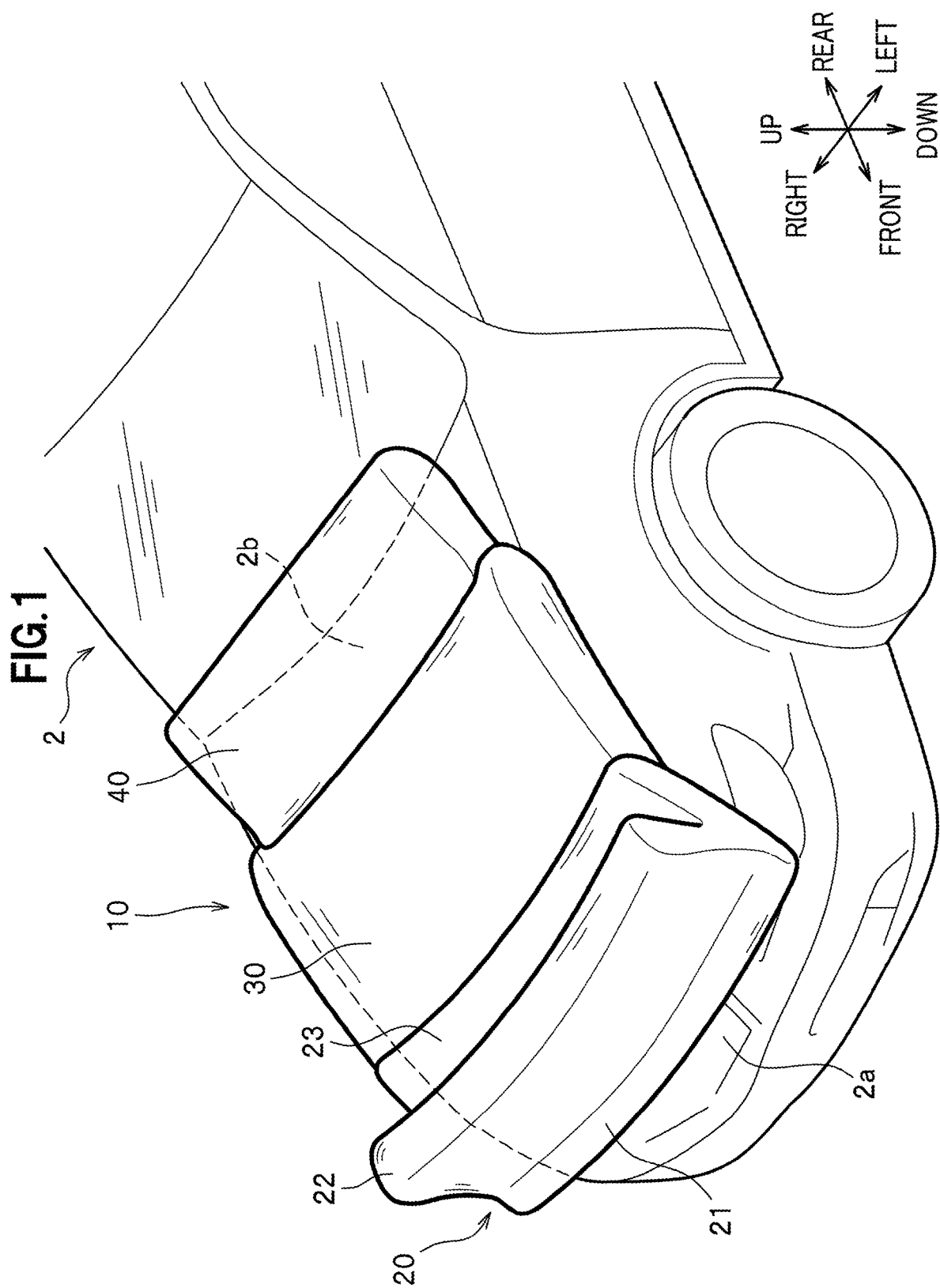
FIG. 1 is a perspective view showing a colliding object protection apparatus according to an embodiment of the present invention.

As shown in FIG. 1, the airbag 10 includes a first bag 20 to be deployed on a front edge part of the hood 2b, and a second bag 30 and a third bag 40 to be deployed on an upper surface of the hood 2b.

The airbag 10 of this embodiment is housed inside an engine room located below the hood 2b in normal times. When the collision determination device detects or predicts the collision of the pedestrian H with the vehicle 2, the hood 2b is lifted up and the airbag 10 is inflated and deployed from a gap between the hood 2b and a front grill 2a to the outside of the vehicle 2 as shown in FIG. 2.

As shown in FIG. 1, the first bag 20 is a tubular bag to be inflated and deployed in a vehicle width direction. The first bag 20 is inflated and deployed along the front edge part of the upper surface of the hood 2b.

The first bag 20 of this embodiment includes a front end portion 21 located at the front edge part of the hood 2b, a vertical bag portion 22 to be inflated and deployed upward from the front end portion 21, and a horizontal bag portion 23 to be inflated and deployed toward the rear of the vehicle from the front end portion 21. A lower part of the front end portion 21 is fixed to a vehicle body.

The first bag 20 is an integrated bag configured such that an internal space of the vertical bag portion 22 and an internal space of the horizontal bag portion 23 communicate with each other through an internal space of the front end portion 21.

As shown in FIG. 2, the first bag 20 is inflated and deployed by sending the gas from the inflator 50 into the first bag 20. Moreover, when inflated and deployed, the first bag 20 takes on a V-shape when viewed sideways as a consequence of the inflation and deployment in two directions, namely, upward and to the rear of the vehicle while using the front end portion 21 as a fixed point. When the first bag 20 is inflated and deployed as described above, a recessed portion is formed at an upper rear part of the first bag 20.

The first bag 20 is provided with a first vent mechanism 24. The first vent mechanism 24 is opened when an internal pressure of the first bag 20 reaches a predetermined first pressure, whereby the gas in the first bag 20 is discharged.

Note that the configuration of the first vent mechanism 24 is not limited. For example, an opening may be formed at a wall part of the first bag 20 and a lid on the opening may come off to open the opening when the internal pressure of the first bag 20 reaches the predetermined first pressure.

As shown in FIG. 1, the second bag 30 is a bag that is continuous with the rear part of the first bag 20. The second bag 30 is inflated and deployed along the upper surface of the hood 2b and toward the rear of the vehicle. The second bag 30 is designed to cover a substantially intermediate portion in a front-rear direction of the upper surface of the hood 2b.

As shown in FIG. 2, the internal space of the horizontal bag portion 23 of the first bag 20 and an internal space of the second bag 30 communicate with each other through the first vent mechanism 24.

Moreover, the second bag 30 is provided with a second vent mechanism 34. The second vent mechanism 34 is opened when an internal pressure of the second bag 30 reaches a predetermined second pressure, whereby the gas in the second bag 30 is discharged. The second pressure to open the second vent mechanism 34 is set lower than the first pressure to open the first vent mechanism 24. Note that the configuration of the second vent mechanism 34 is not limited as with the first vent mechanism 24.

As shown in FIG. 1, the third bag 40 is a bag that is continuous with the rear part of the second bag 30. The third bag 40 is inflated and deployed along the upper surface of the hood 2b and toward the rear of the vehicle. The third bag 40 is designed to cover a rear part in the front-rear direction of the upper surface of the hood 2b.

As shown in FIG. 2, the internal space of the second bag 30 and an internal space of the third bag 40 communicate with each other through the second vent mechanism 34.

Next, a process of the inflation and deployment of the airbag 10 in the colliding object protection apparatus 1 of this embodiment will be described.

Figure 3:
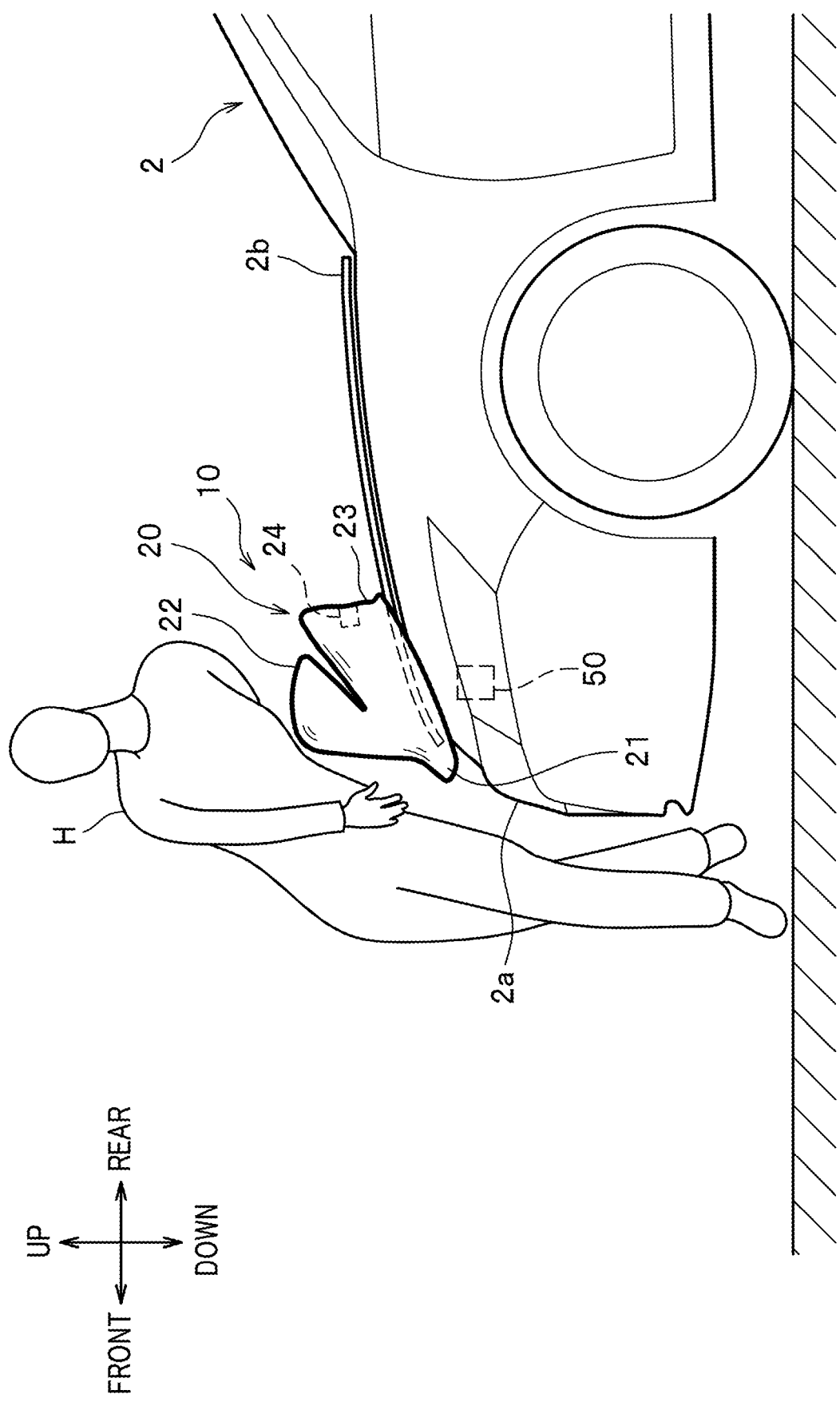
FIG. 3 is a side view showing the colliding object protection apparatus according to the embodiment of the present invention in a state immediately after a collision.

As shown in FIG. 3, when the collision determination device (not shown) detects or predicts the collision of the pedestrian H with the vehicle 2, the hood 2b of the vehicle 2 is lifted up and the inflator 50 is activated.

When the gas is sent from the inflator 50 into the front end portion 21 of first bag 20, the vertical bag portion 22 is inflated and deployed upward and the horizontal bag portion 23 is inflated and deployed toward the rear of the vehicle while using the front end portion 21 as the fixed point.

Figure 4:
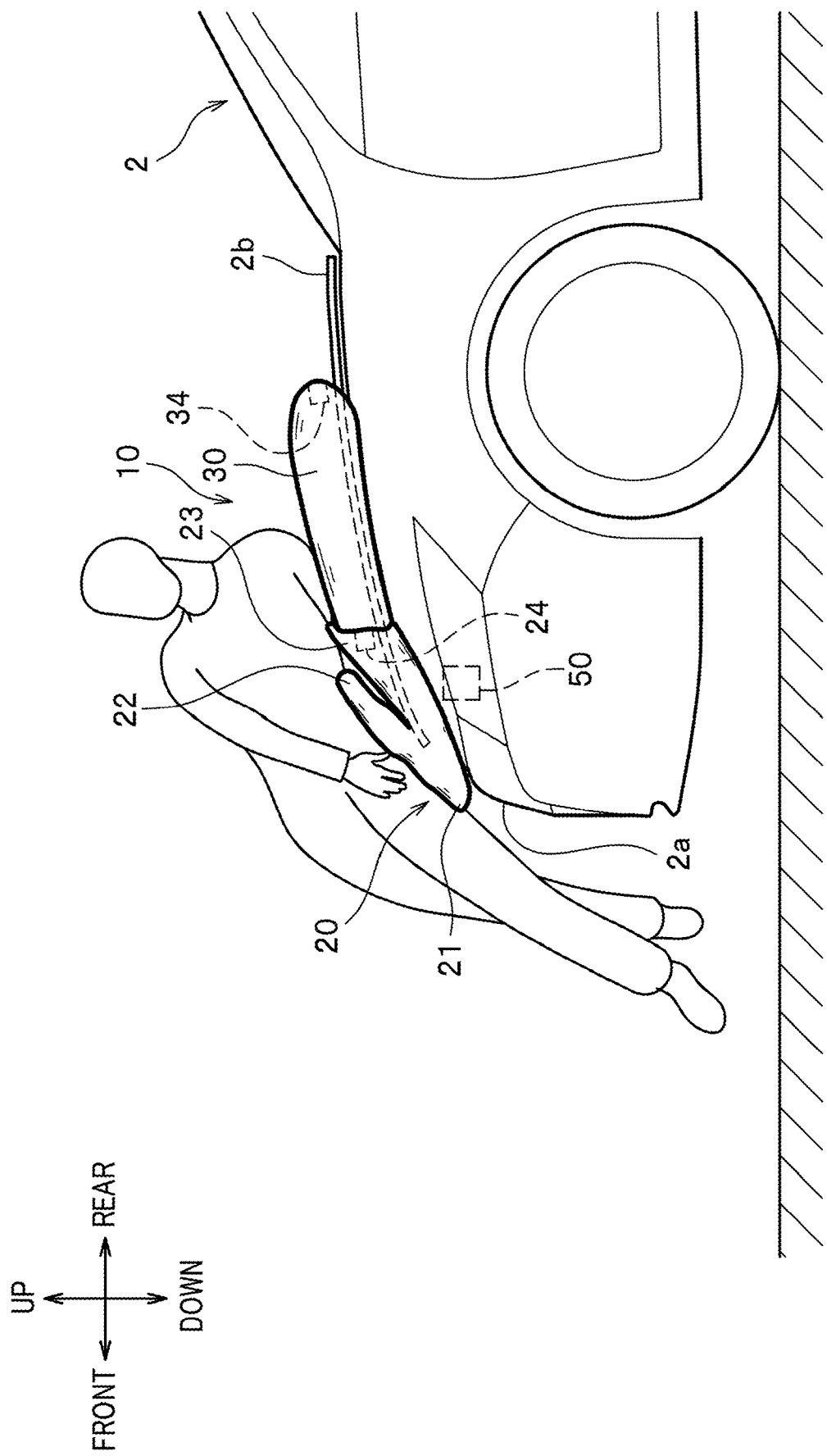
FIG. 4 is a side view showing the colliding object protection apparatus according to the embodiment of the present invention in a state after the collision.

As shown in FIG. 4, when the gas is sent from the inflator 50 into the first bag 20 and the first bag 20 is pushed in as a consequence of the collision of the pedestrian H with the first bag 20, the internal pressure of the first bag 20 reaches the predetermined first pressure. Accordingly, the first vent mechanism 24 is opened and the gas is sent from the first bag 20 into the second bag 30 whereby the second bag 30 is inflated and deployed on the upper surface of the hood 2b.

Figure 5:
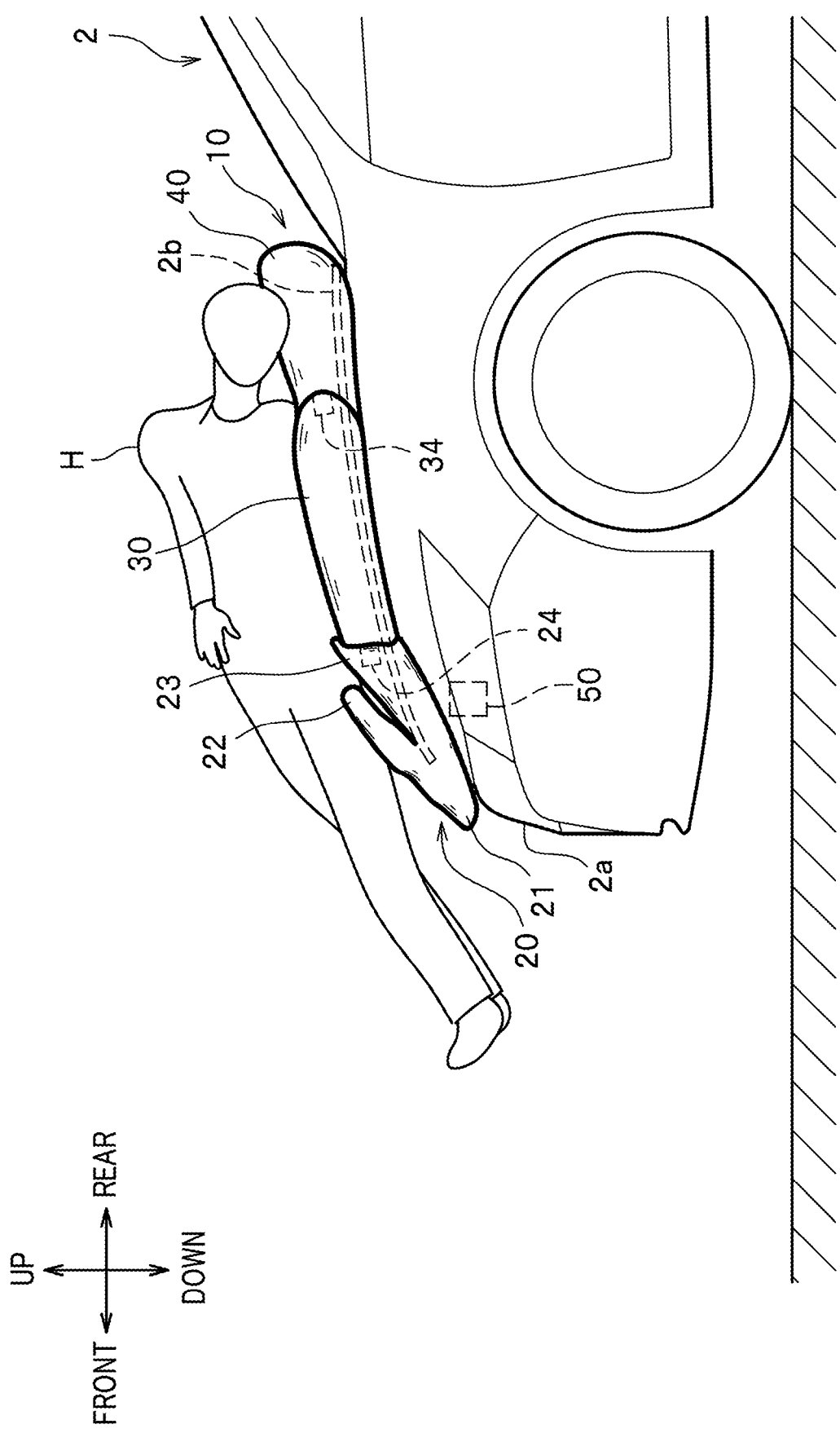
FIG. 5 is another side view showing the colliding object protection apparatus according to the embodiment of the present invention in the state after the collision.

In the meantime, as shown in FIG. 5, when the gas is sent from the first bag 20 into the second bag 30 and the second bag 30 is pushed in as a consequence of the collision of the pedestrian H with the second bag 30, the internal pressure of the second bag 30 reaches the predetermined second pressure. Accordingly, the second vent mechanism 34 is opened and the gas is sent from the second bag 30 into the third bag 40 whereby the third bag 40 is inflated and deployed on the upper surface of the hood 2b.

As shown in FIG. 2, the colliding object protection apparatus 1 of this embodiment is configured to inflate and deploy the airbag 10 when the collision of the pedestrian H is detected or predicted. The airbag 10 includes the first bag 20 to be inflated and deployed in the vehicle width direction along the front edge part of the hood 2b of the vehicle 2, and the second bag 30 to be inflated and deployed on the upper surface of the hood 2b of the vehicle 2. The second bag 30 is continuous with the vehicle rear side of the first bag 20. The internal space of the first bag 20 and the internal space of the second bag 30 communicate with each other through the first vent mechanism 24. The first vent mechanism 24 is designed to be opened when the internal pressure of the first bag 20 reaches the predetermined first pressure.

According to the colliding object protection apparatus 1 of this embodiment, even when the first bag 20 is inflated and deployed, the first vent mechanism 24 is not opened until the internal pressure of the first bag 20 reaches the predetermined first pressure. Thus, it is possible to increase the internal pressure of the first bag 20 quickly. Then, the first bag 20 at a high pressure can surely catch the waist of the pedestrian H as shown in FIG. 3.

As described above, the colliding object protection apparatus 1 can rapidly eliminate a difference in speed between the vehicle 2 and the pedestrian H by catching the waist of the pedestrian H being the position of the center of gravity of the pedestrian H in case of the collision. Thus, the colliding object protection apparatus 1 can restrain behavior of the pedestrian H. In other words, the colliding object protection apparatus 1 can control the behavior of the pedestrian H so as not to flip up the legs of the pedestrian H too much.

Moreover, by catching the waist of the pedestrian H which is the position of the center of gravity, it is possible to prevent the head of the pedestrian H from colliding with a pillar or a front windshield of the vehicle 2.

As a consequence, according to the colliding object protection apparatus 1, it is possible to reliably protect the pedestrian H by using the airbag 10, and thus to effectively prevent the pedestrian H from being injured.

Furthermore, according to the colliding object protection apparatus 1 of this embodiment, the first vent mechanism 24 is opened when the internal pressure of the first bag 20 reaches the predetermined first pressure, whereby the gas is sent from the first bag 20 into the second bag 30 as shown in FIG. 4. In this way, the second bag 30 is inflated and deployed on the upper surface of the hood 2b. Accordingly, it is possible to protect the upper body of the pedestrian H falling onto the hood 2b by using the second bag 30.

As shown in FIG. 3, the first bag 20 of this embodiment includes the front end portion 21 located at the front edge part of the hood 2b, the vertical bag portion 22 to be inflated and deployed upward from the front end portion 21, and the horizontal bag portion 23 to be inflated and deployed from the front end portion 21 toward the rear of the vehicle.

According to this configuration, when the vertical bag portion 22 hits against the waist of the pedestrian H, the vertical bag portion 22 is pushed in rearward. In the meantime, a tensile force acts on a surface of the vertical bag portion 22 whereby the shape of the vertical bag portion 22 can be stabilized. In this way, the first bag 20 can surely catch the waist of the pedestrian H.

Meanwhile, it is possible to increase strength of the first bag 20 so that the first bag 20 can prevent a deformation of the hood 2b.

In the meantime, the first bag 20 of this embodiment takes on the V-shape when viewed sideways as shown in FIG. 2. Accordingly, the internal pressure of the first bag 20 can be increased quickly with the small inflator 50 as compared to a case where the bag takes on a square shape when viewed sideways.

Moreover, the horizontal bag portion 23 can stabilize the shape of the first bag 20 by receiving a reaction force from the hood 2b. Thus, the first bag 20 can surely catch the waist of the pedestrian H.

In addition, since the first bag 20 is designed to be inflated and deployed upward and to the rear of the vehicle, the first bag 20 can be inflated and deployed even after the pedestrian H collides with the vehicle 2. Accordingly, it is possible to securely protect the pedestrian H even in a situation where the collision determination device can hardly recognize the pedestrian H.

As shown in FIG. 5, the colliding object protection apparatus 1 of this embodiment includes the third bag 40 which is continuous with the vehicle rear side of the second bag 30 and is designed to be inflated and deployed on the upper surface of the hood 2b. The internal space of the second bag 30 and the internal space of the third bag 40 communicate with each other through the second vent mechanism 34. The second vent mechanism 34 is designed to be opened when the internal pressure of the second bag 30 reaches the predetermined second pressure.

According to the colliding object protection apparatus 1 of this embodiment, the second vent mechanism 34 is opened when the internal pressure of the second bag 30 reaches the predetermined second pressure, whereby the gas is sent from the second bag 30 into the third bag 40. In this way, the third bag 40 is inflated and deployed on the rear part of the upper surface of the hood 2b. Accordingly, it is possible to reliably protect the head of the pedestrian H falling onto the hood 2b by using the third bag 40.

Although the embodiment of the present invention has been described above, it is to be understood that the present invention is not limited only to this embodiment and appropriate modifications are possible within a range not departing from the scope of the invention.

In the colliding object protection apparatus 1 of this embodiment, the first bag 20 includes the vertical bag portion 22 and the horizontal bag portion 23 as shown in FIG. 2. However, the shape of the first bag 20 is not limited only to the foregoing. For instance, partition walls to be arranged in a vehicle width direction may be provided in the internal space of the first bag 20 and the internal space of the first bag 20 may be divided into multiple sub-spaces with the partition walls.

In the colliding object protection apparatus 1 of this embodiment, the vertical bag portion 22 and the horizontal bag portion 23 of the first bag 20 are integrally formed. Instead, the vertical bag portion 22 and the horizontal bag portion 23 may be formed separately from each other. In the latter configuration, a front end part of the vertical bag portion 22 and a front end part of the horizontal bag portion 23 are stacked on each other and arranged at the front edge part of the hood 2b.

In the colliding object protection apparatus 1 of this embodiment, the airbag 10 is inflated and deployed from the gap between the front grill 2a and the hood 2b to the outside of the vehicle 2. However, the location to house the airbag 10 is not limited. For instance, the airbag 10 may be housed in the front grill 2a and a lid provided to the front grill 2a may be pushed and opened to inflate and deploy the airbag 10 therefrom.

The colliding object protection apparatus 1 of this embodiment includes the third bag 40. However, the third bag 40 does not always have to be provided if the head of the pedestrian H can be protected by using the second bag 30.

In the meantime, a lower bag to be inflated and deployed on a front surface of the front grill 2a may be provided. In this case, it is possible to prevent the legs of the pedestrian H from being caught in a portion under the vehicle 2.

What is claimed is:

1. A colliding object protection apparatus to inflate and deploy an airbag when the apparatus detects or predicts a collision with a colliding object, the apparatus comprising the airbag, wherein
the airbag includes
a first bag to be inflated and deployed in a vehicle width direction along a front edge part of a hood of a vehicle, and
a second bag to be inflated and deployed on an upper surface of the hood,
the second bag is continuous with a vehicle rear side portion of the first bag,
an internal space of the first bag and an internal space of the second bag communicate with each other through a first vent mechanism which includes a first communication hole and a first lid which covers the first communication hole, and
the first lid of the first vent mechanism is opened when an internal pressure of the first bag reaches a first predetermined pressure.

2. The colliding object protection apparatus according to claim 1, further comprising:
a third bag being continuous with a vehicle rear side portion of the second bag and configured to be inflated and deployed on the upper surface of the hood, wherein
the internal space of the second bag and an internal space of the third bag communicate with each other through a second vent mechanism which includes a second communication hole and a second lid which covers the second communication hole, and
the second lid of the second vent mechanism is opened when an internal pressure of the second bag reaches a second predetermined pressure.

3. The colliding object protection apparatus according to claim 1, wherein
the first bag includes
a front end portion located at the front edge part of the hood,
a vertical bag portion to be inflated and deployed upward from the front end portion, and
a horizontal bag portion to be inflated and deployed toward a rear side of the vehicle from the front end portion.

4. The colliding object protection apparatus according to claim 2, wherein
the first bag includes
a front end portion located at the front edge part of the hood,
a vertical bag portion to be inflated and deployed upward from the front end portion, and
a horizontal bag portion to be inflated and deployed toward a rear side of the vehicle from the front end portion.

5. The colliding object protection apparatus according to claim 2, wherein the second predetermined pressure is lower than the first predetermined pressure.

\* \* \* \* \*